United States Patent [19]

Katoh et al.

[11] Patent Number: 4,890,177

[45] Date of Patent: Dec. 26, 1989

[54] GUIDE DRUM ASSEMBLY WITH BUILT-IN MOTOR HAVING FLOATING ROTOR

[75] Inventors: Hiroshi Katoh, Chigasaki; Hiromi Taguchi, Yokohama; Shoji Kikunaga, Tokyo, all of Japan

[73] Assignee: Victor Company of Japan, Ltd., Kanagawa, Japan

[21] Appl. No.: 166,566

[22] Filed: Mar. 11, 1988

[30] Foreign Application Priority Data

Mar. 13, 1987 [JP] Japan .................................. 62-59660

[51] Int. Cl.⁴ ......................... G11B 5/52; G11B 21/04
[52] U.S. Cl. .................................................... 360/107
[58] Field of Search .................... 360/107, 108, 84, 85

[56] References Cited
FOREIGN PATENT DOCUMENTS 56-51021 5/1981 Japan ................................. 360/107

Primary Examiner—Robert S. Tupper
Attorney, Agent, or Firm—Michael N. Meller

[57] ABSTRACT

A guide drum assembly comprises a rotary drum mounted with at least one rotary magnetic head, a rotary shaft rigidly fixed to the rotary drum so that the rotary drum rotates when the rotary shaft rotates, a motor having a stator and a rotor which generates a torque for driving the rotary shaft, and a resilient member having both viscosity and resiliency for resiliently coupling the rotor to the rotary shaft. The resilient member absorbs vibrations in a circumferential direction of the rotor.

12 Claims, 4 Drawing Sheets

GUIDE DRUM ASSEMBLY WITH BUILT-IN MOTOR HAVING FLOATING ROTOR

BACKGROUND OF THE INVENTION

The present invention generally relates to guide drum assemblies, and more particularly to a guide drum assembly for use in a rotary head type magnetic recording and/or reproducing apparatus.

For example, a guide drum assembly of a video tape recorder comprises a guide drum made up of a rotary drum and a stationary drum. The rotary drum is rigidly fixed to a rotary shaft which penetrates a center hole in the stationary drum and is driven by a motor to rotate the rotary drum. A pair of rotary magnetic heads, for example, are mounted on the rotary drum and rotates together with the rotary drum. A magnetic tape is wrapped obliquely around an outer peripheral surface of the guide drum for a predetermined angular range and is transported in a tape transport direction. Signals are recorded and/or reproduced on and/or from the magnetic tape by the rotary magnetic heads.

Basically, there are two methods of driving the rotary shaft to rotate the rotary drum. According to a first method which is often referred to as the belt drive system, a pulley is fixed to an end of the rotary shaft, and a belt is provided between the pulley and a driving shaft of the motor which is provided independently of the guide drum assembly. Hence, the rotary drum is rotated indirectly by way of the belt. According to a second method which is often referred to as the direct drive system, a rotor of the motor is mounted directly on the rotary shaft, and the motor is an integral part of the guide drum assembly. Thus, the rotary drum is rotated directly by the rotor.

The belt drive system has a low frequency transfer characteristic, and for this reason, the cogging and torque ripple of the motor virtually do not affect the rotary drum. However, because of the low frequency transfer characteristic, it is impossible to servo control finely the rotation of the rotary drum, and it is difficult to eliminate a jitter in the low frequency range. For these reasons, the direct drive system is popularly used in the video tape recorder and the like for rotating the rotary drum.

FIG. 1 shows a conventional guide drum assembly of the video tape recorder. A magnetic tape 1 is wrapped obliquely around an outer peripheral surface of a guide drum 4 for a predetermined angular range defined by a pair of guide poles 2 and 3. The magnetic tape 1 is transported in a direction A, and rotary magnetic heads $H_1$ and $H_2$ mounted on a rotary drum of the guide drum 4 rotate at a high speed in a direction B together with the rotary drum. A rotary shaft 6 is rigidly fixed on the rotary drum of the guide drum 4, and the rotary drum is rotated by driving the rotary shaft 6. Generally, the rotary shaft 6 is made of stainless steel or the like. The heads $H_1$ and $H_2$ alternately scan the magnetic tape 1 obliquely to a longitudinal direction of the magnetic tape 1 to record and/or reproduce signals on and/or from tracks of the magnetic tape 1.

Because the rotary drum of the guide drum 4 rotates at the high speed, an air flow is generated along the periphery of the guide drum 4 as indicated by arrows in FIG. 1, and a so-called air film 5 is formed between the outer peripheral surface of the guide drum 4 and the magnetic tape 1. The thickness of the air film 5 is not uniform throughout the entire predetermined angular range. As indicated by a curve I in FIG. 2, the thickness of the air film 5 is largest at an entrance portion C where the air flow enters with respect to the guide drum 4 along the tape transport direction A, and gradually decreases toward an intermediate portion D and an exit portion E. There is a sudden decrease in the thickness of the air film 5 at the exit portion E due to a vacuum caused by the air flow in a direction F. In other words, even though the magnetic tape 1 is floating with respect to the guide drum 4, the magnetic tape 1 abruptly approaches the outer peripheral surface of the guide drum 4 at the exit portion E. The heads $H_1$ and $H_2$ are mounted on the rotary drum of the guide drum 4 at such positions that the heads $H_1$ and $H_2$ project from the outer peripheral surface of the guide drum by a distance greater than a maximum thickness of the air film 5. As a result, the heads $H_1$ and $H_2$ hit the magnetic tape 1 harder at the exit portion E.

When the heads $H_1$ and $H_2$ hit the magnetic tape 1 at the exit portion E, a resistance is generated with respect to the rotation of the heads $H_1$ and $H_2$, that is, the rotation of the rotary drum of the guide drum 4. Hence, the guide drum 4 is subject to a periodic external disturbance of 60 Hz in a pulse form, for example, and the rotary shaft 6 undergoes a torsional vibration.

In the conventional guide drum assembly, the rotary shaft 6 undergoes a large torsional vibration when a harmonic frequency of the external disturbance coincides with a natural resonant frequency $f_0$ of the rotary system. In this case, the rotational speed of the heads $H_1$ and $H_2$ deviates, and a jitter is introduced in a reproduced signal obtained from the heads $H_1$ and $H_2$. Therefore, a conspicuous jitter is generated in a reproduced picture, at a frequency in a vicinity of the natural resonant frequency $f_0$, and there is a problem in that it is difficult to obtain a reproduced picture of a high quality.

A Japanese Laid-Open Utility Model application No. 1-61610 discloses a guide drum assembly employing the direct drive system for eliminating some of the problems of the conventional guide drum assembly described heretofore. According to this proposed guide drum assembly, an inertial body (weight) having a predetermined mass is attached through a resilient member to the rotor of the motor which drives the rotary drum. The resilient member has both viscosity and elasticity. Hence, a combination of the inertial body and the resilient member acts as a vibration absorbing system (damper) for absorbing to a certain extent the torsional vibration of the rotary shaft which rotates the rotary drum.

However, in the proposed guide drum assembly, the rotor is rigidly fixed to the rotary shaft. For this reason, the cogging and torque ripple of the motor generated by its rotor are transmitted to the rotary drum by way of the rotary shaft, and as a result, the jitter is generated as the unstable rotation and the vibration of the rotary drum. In addition, even by use of the resilient member, it is impossible to completely eliminate the torsional vibration of the rotary shaft. Hence, due to the remaining torsional vibration which cannot be eliminated, there are problems in that the rotary drum undergoes unstable rotation and a stator of the motor vibrates because of a counter torque of the rotor.

SUMMARY OF THE INVENTION

Accordingly it is a general object of the present invention to provide a novel and useful guide drum assembly in which the problems described heretofore are eliminated.

Another and more specific object of the present invention is to provide a guide drum assembly comprising a rotary drum mounted with at least one rotary magnetic head, a rotary shaft rigidly fixed to a center portion of the rotary drum so that the rotary drum rotates when the rotary shaft rotates, a motor having a stator and a rotor which generates a torque for driving the rotary shaft, and a resilient member having both viscosity and elasticity for providing a flexible coupling between the rotor and the rotary shaft. The resilient member absorbs vibrations in a circumferential direction of the rotary shaft. According to the guide drum assembly of the present invention, the vibration of the rotor due to the cogging and torque ripple of the motor is absorbed by the resilient member, and the vibration is prevented from reaching the rotary shaft. Hence, it is possible to considerably reduce the unstable rotation of the rotary drum caused by the torque ripple and essentially eliminate the undesirable effects of the jitter.

Other objects and further features of the present invention will be apparent from the following detailed description when read in conjunction with the accompanying drawings.

DETAILED DESCRIPTION

Figure 1:
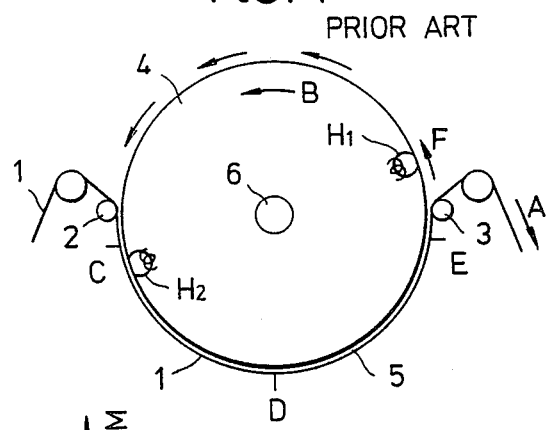
FIG. 1 is a plan view showing an essential part of the conventional guide drum assembly together with a magnetic tape.
Figure 2:
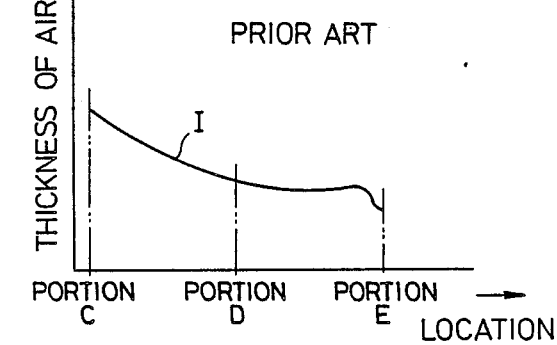
FIG. 2 is a graph showing a change in the thickness of an air film formed between a guide drum and the magnetic tape in FIG. 1.
Figure 3:
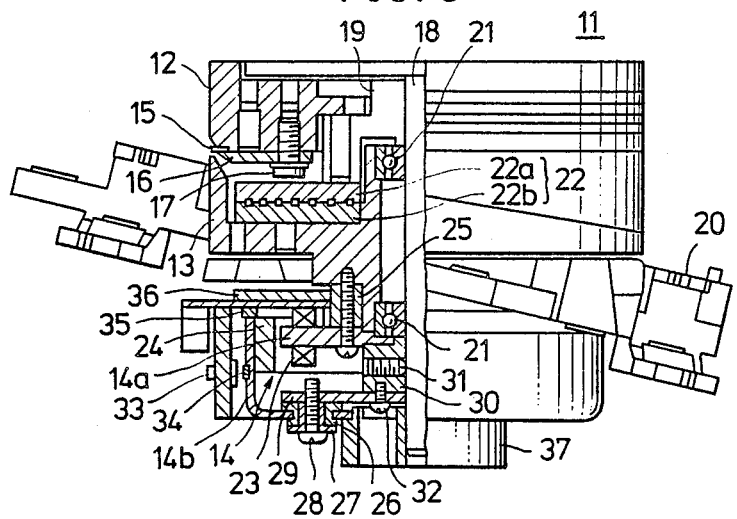
FIG. 3 is a side view in partial cross section showing a first embodiment of the guide drum assembly according to the present invention.

FIG. 3 shows a first embodiment of the guide drum assembly according to the present invention. A guide drum assembly 11 employs the direct drive system and generally comprises a rotary upper drum 12, a lower stationary drum 13 and a motor 14 for rotating the rotary drum 12. A head support 16 is fixed on a bottom part of the rotary drum 12 by a mounting screw 17, and a magnetic head 15 is mounted on the head support 16. A flywheel 19 is rigidly fixed to an end of a rotary shaft 18, and the rotary drum 12 is rigidly fixed on the flywheel 19.

The stationary drum 13 is fixed on a base 20 which is mounted on a chassis (not shown) of a video tape recorder or the like. The rotary shaft 18 penetrates a center hole in the stationary drum 13 and is supported by bearings 21 which are provided on the stationary drum 13. A rotary transformer 22 comprises a rotary transformer half 22a provided on a lower surface of the rotary drum 12 and a rotary transformer half 22b provided on an upper surface of the stationary drum 13, and is used for signal transmission and/or reception of the magnetic recording and/or reproduction.

The motor 14 comprises a stator 14a provided with a driving coil 23, and a ring shaped rotor 14b provided with a magnet 24 which is separated from and confronts an outer periphery of the stator 14a to generate a torque in the rotor 14b. The stator 14a is fixed on a lower surface of the stationary drum 13 by a mounting screw 25.

Figure 4:
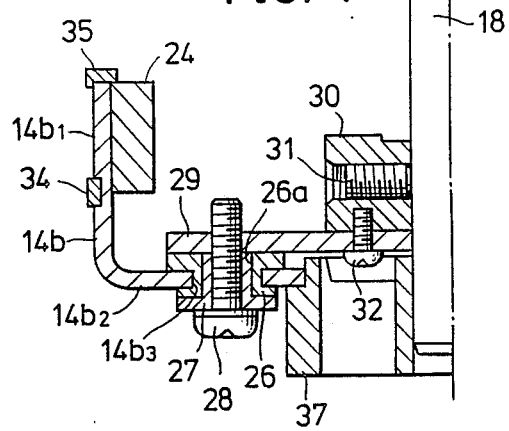
FIG. 4 is a cross sectional view on an enlarged scale showing a rotor part of a motor in the first embodiment.

As shown in FIG. 4 on an enlarged scale, the rotor 14b has an L-shape in the partial cross section, and the magnet 24 is provided on an inner peripheral surface of a vertical portion $14b_1$ of the rotor 14b. A magnet 34 which confronts a pulse generator head 33 is provided on an outer peripheral surface of the vertical portion $14b_1$. The pulse generator head 33 generates a pulse signal in cooperation with the magnet 34 for controlling the rotational phase of the motor 14. A magnet 35 is provided at an upper end of the vertical portion $14b_1$ and confronts a printed circuit board 36 of the motor 14. The printed circuit board 36 generates a frequency signal in cooperation with the magnet 35 for controlling the rotation speed of the motor 14.

A penetration hole $14b_3$ is provided in a horizontal portion $14b_2$ of the rotor 14b, and a resilient member 26 having both viscosity and elasticity is fitted into the hole $14b_3$. The inside of the hole $14b_3$ and peripheral portions above and below the hole $14b_3$ are covered by the member 26. For example, the resilient member 26 is made of rubber or the like having both viscosity and elasticity. As will be described later, the member 26 constitutes a lowpass filter of a vibration system so as to isolate the torque ripple of the motor 14 and eliminate the torsional vibration of the rotary shaft 18.

A sleeve 27 is fitted into a center hole 26a in the resilient member 26, and a mounting screw 28 is inserted into the sleeve 27. The mounting screw 28 is screwed into a screw hole of a disc 29. A ring 30 is secured on the rotary shaft 18 by a securing screw 31 so as to eliminate play of the rotary shaft 18 in an axial direction. In addition, the disc 29 is fixed on a lower surface of the ring 30 by a mounting screw 32. Accordingly, the rotor 14b is coupled to the rotary shaft 18 by way of the resilient member 26.

A restricting member 37 rotatably fits on a lower end of the rotary shaft 18 and is affixed to the horizontal portion 14$b_2$ of the rotor 14$b$. The restricting member 37 is used to hold the rotor 14$b$ vertically along the rotary shaft 18. The restricting member 37 restricts the displacement of the rotor 15$b$ in a radial direction thereof. As a result, the rotor 14$b$ may be elastically displaced in a circumferential direction thereof but cannot be displaced in the radial direction with respect to the rotary shaft 18.

Figure 5:
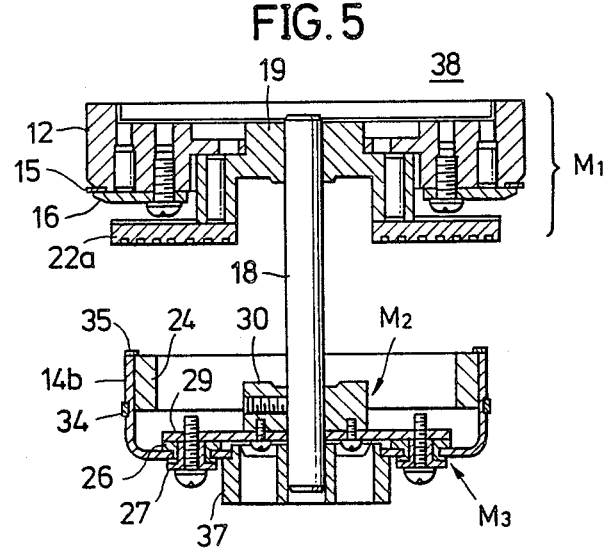
FIG. 5 is a side view in cross section showing a rotary body which rotates together with a rotor of a motor of the first embodiment.

FIG. 5 shows a rotary body 38 which rotates together with the rotor 14$b$ of the motor 14 in the guide drum assembly 11. When the rotary body 38 is considered as being a vibration system, the vibration system is made up of an upper assembly M1, a lower assembly M2 and a rotor assembly M3. The upper assembly M1 comprises the rotary drum 12 rigidly provided on the upper end of the rotary shaft 18, the flywheel 19, the magnetic head 15, the head support 16 and the rotary transformer half 22$a$. The lower assembly M2 comprises the ring 30 provided on the lower end of the rotary shaft 18 and the disc 29. The rotor assembly M3 comprises the rotor 14$b$, and the magnets 24, 34 and 35. In addition, when a torsion spring constant of the rotary shaft 18 is denoted by K1, a spring constant of the member 26 by K2 and a viscous damping coefficient of the member 26 by D2, the vibration system (rotary body 38) may be described by a vibration model shown in FIG. 6.

Figure 6:
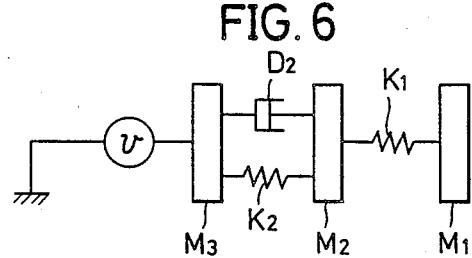
FIG. 6 shows a vibration model for explaining a vibration system constituted by the rotary body shown in FIG. 5.

In FIG. 6, the rotor 14$b$ of the motor 14 is mounted on the lower assembly M2 by way of the resilient member 26, and is equivalent to being supported through a dashpot and a spring. For this reason, even when the cogging and torque ripple of the motor 14 occur and a velocity v is applied to the vibration system shown in FIG. 6 due to the change in the torque, this velocity v is absorbed (attenuated) by the viscosity and elasticity of the resilient member 26 and will not be transmitted to the lower assembly M2. In other words, the torque ripple of the motor 14 is isolated, and the rotary drum 12 will not undergo unstable rotation due to the torque ripple.

Figure 7:
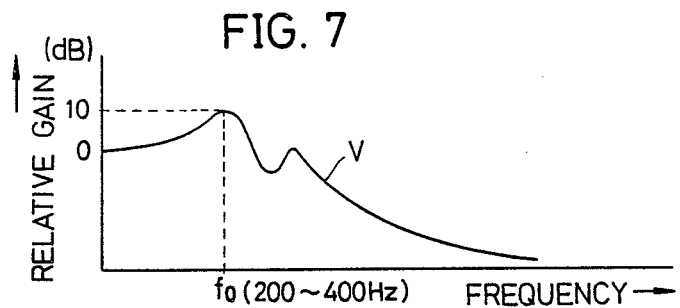
FIG. 7 shows a theoretical frequency transfer characteristic of the vibration system shown in FIG. 6.
Figure 8:
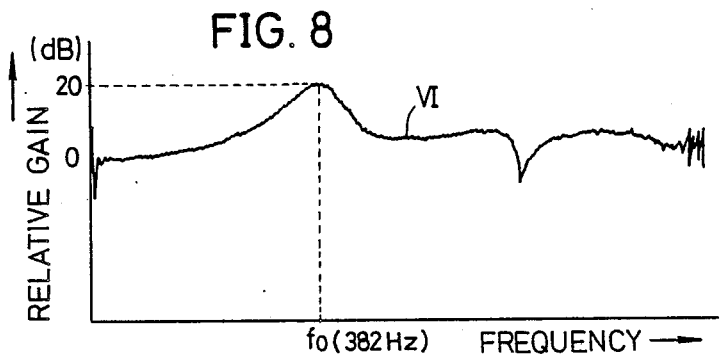
FIG. 8 shows a frequency transfer characteristic which is actually obtained from measurements taken when the rotary body shown in FIG. 5 is driven.

The frequency transfer characteristic of the vibration system shown in FIG. 6 is determined by the moment of inertia of each of the assemblies M1, M2 and M3. FIG. 7 shows a theoretical frequency transfer characteristic V of the vibration system shown in FIG. 6. On the other hand, FIG. 8 shows a frequency transfer characteristic VI which is actually obtained from measurements taken when the rotary body 38 shown in FIG. 5 is driven.

Figure 9:
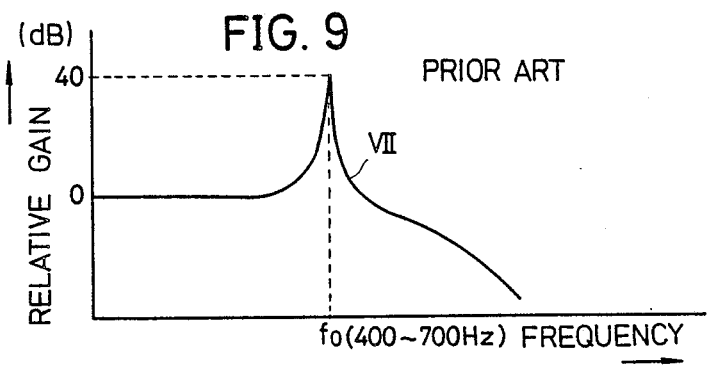
FIG. 9 shows a frequency transfer characteristic of the conventional guide drum assembly employing the direct drive system.
Figure 10:
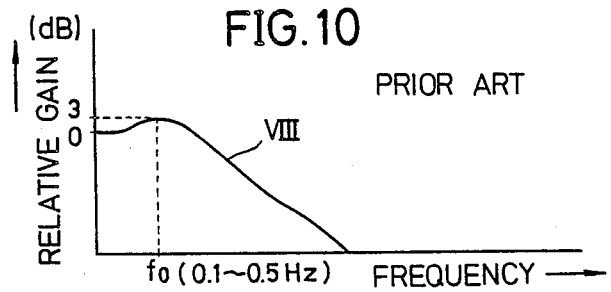
FIG. 10 shows a frequency transfer characteristic of the conventional guide drum assembly employing the belt drive system.
Figure 11:
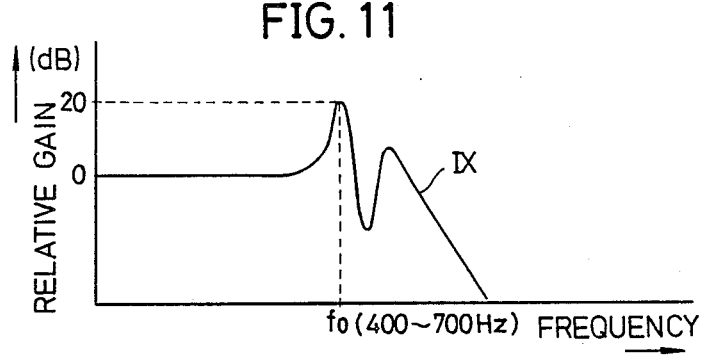
FIG. 11 shows a frequency transfer characteristic of the previously proposed guide drum assembly.

FIG. 9 shows a frequency transfer characteristic VII of the conventional guide drum assembly employing the direct drive system, FIG. 10 shows a frequency transfer characteristic VIII of the conventional guide drum assembly employing the belt drive system, and FIG. 11 shows a frequency transfer characteristic IX of the previously proposed guide drum assembly (damper system) described before.

Next, a comparison will be made of the frequency transfer characteristic obtained in the first embodiment and the frequency transfer characteristics shown in FIGS. 9 through 11.

First, in the case of the conventional guide drum assembly employing the direct drive system, the frequency transfer characteristic VII shown in FIG. 9 is determined by the moment of inertia of the upper assembly on the rotary shaft (corresponding to M1) and the moment of inertia of the lower assembly on the rotary shaft (corresponding to M2). As shown in FIG. 9, a sharp resonant characteristic of approximately 40 dB is seen at a resonant frequency $f_0$. Hence, when this resonant frequency $f_0$ and a harmonic frequency (for example, 29.97 Hz in NTSC system and 25 Hz in PAL system) of the rotation frequency of the rotary shaft coincide, the rotary drum undergoes vibration upon rotation and causes a jitter. Further, when the torque ripple of the motor exists in a vicinity of the frequency $f_0$, the rotary shaft undergoes considerable vibration upon rotation.

On the other hand, in the case of the conventional guide drum assembly employing the belt drive system, a resonant characteristic of approximately 3 dB is seen at the resonant frequency $f_0$ in the frequency transfer characteristic VIII shown in FIG. 10. Since the frequency transfer characteristic VIII is limited to an extremely low range, the torque ripple of the motor virtually does not affect the rotary drum. In addition, because the moment of inertia at the lower end of the rotary shaft is extremely small due to the fact that only the pulley is provided at the lower end of the rotary shaft and no motor components are directly coupled thereto, the torsional resonant frequency of the rotary shaft becomes over 5 kHz, and the undesirable effects of the jitter are essentially negligible. However, because of the low frequency transfer characteristic, it is impossible to fine servo control the rotation of the rotary drum, and it is difficult to eliminate the jitter caused by the unstable rotation of the rotary drum.

In the case of the previously proposed guide drum assembly, a resonant characteristic seen at the resonant frequency $f_0$ in the frequency transfer characteristic IX shown in FIG. 11 is improved by 20 dB to become 20 dB compared to the case shown in FIG. 9. However, in the proposed guide drum assembly, the rotor is rigidly fixed to the rotary shaft. For this reason the cogging and torque ripple of the motor are transmitted to the rotary drum by way of the rotary shaft, and as a result, a jitter is generated by the unstable rotation and the vibration of the rotary drum. In addition, even by use of the resilient member, it is impossible to completely eliminate the torsional vibration of the rotary shaft. Hence, due to the remaining torsional vibration, there are problems in that the rotary drum undergoes unstable rotation and the stator of the motor vibrates because of a counter torque of the rotor.

According to the first embodiment of the present invention, the resonant characteristic shown in FIG. 8 exhibits an improvement up to 20 dB compared to the case shown in FIG. 9, the resonant characteristic is an intermediary between those shown in FIGS. 9 and 10. Accordingly, the guide drum assembly 11 does not have an extreme resonant characteristic and can satisfactorily control the rotation of the rotary drum 12. Furthermore, the torque ripple of the motor used in the direct drive system is usually in a frequency range of approximately 300 Hz to 800 Hz. The frequency transfer characteristic of the first embodiment in this frequency range is considerably improved compared to those shown in FIGS. 9 and 11. Accordingly, the guide drum assembly 11 is capable of considerably reducing the jitter caused by the torque ripple of the motor 14 or the torsional vibration of the rotary shaft 18.

Figure 12:
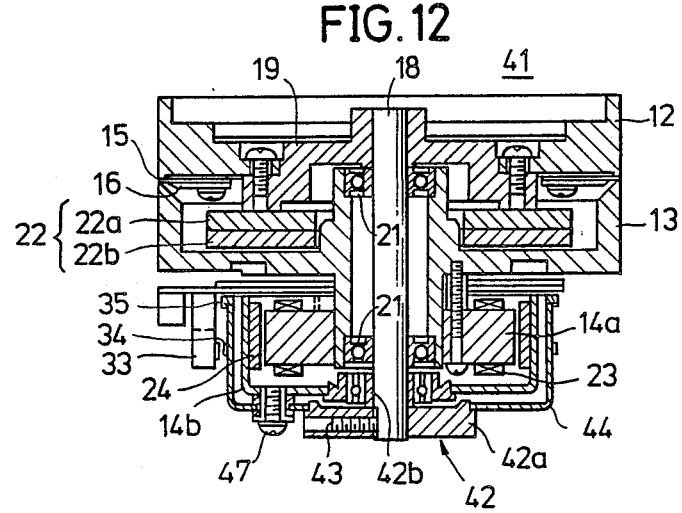
FIG. 12 is a side view in cross section showing a second embodiment of the guide drum assembly according to the present invention.

Next, a description will be given on a second embodiment of the guide drum assembly according to the present invention, by referring to FIG. 12. In FIG. 12, those parts which are the same as those corresponding parts in FIG. 3 are designated by the same reference numerals, and a description thereof will be omitted. In FIG. 12, a restricting member 42 is fixed on the lower end of the rotary shaft 18 of a guide drum assembly 41 by a screw 43. The restricting member 42 comprises a large diameter portion 42a and a small diameter portion 42b which extends in the axial direction from the large diameter portion 42a and is fixed to an inner race of a bearing 48 as shown in FIG. 13.

Figure 13:
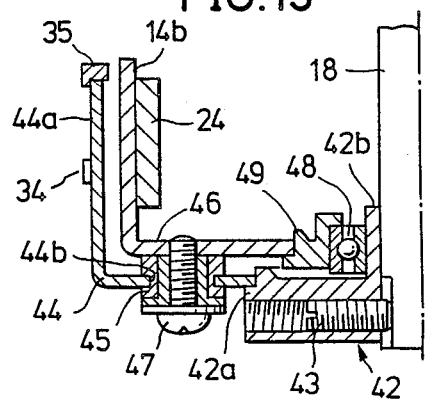
FIG. 13 is a cross sectional view on an enlarged scale showing a rotor part of the second embodiment.

As shown in FIG. 13, a ring shaped rotor holder 44 is rigidly mounted on an outer periphery of the large diameter portion 42a of the restricting member 42. The rotor holder 44 comprises a vertical portion 44a. The magnet 34 is provided on an outer peripheral surface of the vertical portion 44a, while the magnet 35 is provided on an upper end of the vertical portion 44a. A resilient member 45 having viscosity and elasticity is fitted into a penetrating hole 44b in the rotor holder 44. A rotor 46 which has the magnet 24 of the motor 14 is coupled to the rotor holder 44 by way of the resilient member 45 by a screw 47. In addition, an inner periphery of the rotor 46 is mounted on a member 49 which fits on an outer race of the bearing 48 so that the rotor 46 is restricted to an elastic circumferential movement with respect to the rotary shaft 18, thereby no radial movement of the rotor 46 is allowed.

Accordingly, even when the rotor 46 vibrates due to the torque ripple of the motor 14, this vibration is absorbed (damped) by the resilient member 45 and will not reach the rotor holder 44. In other words, it is possible to prevent the rotary drum 12 from vibrating due to the torque ripple of the motor 14, and thus, it is possible to prevent undesirable effects of the jitter. In addition, since the magnets 34 and 35 are provided on the rotor holder 44, the vibration of the rotor 46 will not be transmitted to the magnets 34 and 35. For this reason, it is possible to accurately generate the signals for controlling the rotational phase and rotation frequency of the motor 14 as the magnets 34 and 35 pass respective positions of the head 33 and the printed circuit board 36 up to the high frequency range. As a result, it is possible to accurately control the rotational phase and rotation frequency of the motor 14 up to the high frequency range.

In the embodiments described heretofore, the guide drum assembly is for use in the video tape recorder. However, the application of the present invention is not limited to the video tape recorder and may be applied to any rotary head type magnetic recording and/or reproducing apparatus which employs at least one rotary magnetic head, such as the so-called 8 mm video tape recorder and digital audio tape recorder.

Further, the present invention is not limited to these embodiments, but various variations and modifications may be made without departing from the scope of the present invention.

What is claimed is:

1. A guide drum assembly comprising:
   a rotary drum mounted with at least one rotary magnetic head;
   a stationary drum arranged coaxially with said rotary drum confronted thereby;
   a rotary shaft rigidly and directly fixed to a center portion of said rotary drum so that said rotary drum rotates when said rotary shaft rotates;
   a built-in motor incorporated in said guide drum assembly and having a stator which is fixed to said stationary drum and a rotor which is coaxial with said rotary shaft and generates a torque for driving said rotary shaft; and
   a resilient member having both viscosity and elasticity and being interposed between said rotor and said rotary shaft so that said rotor is coupled to said rotary shaft and is displaceable with respect to said rotary shaft in a circumferential direction of said rotary shaft, said torque being transferred to said rotary shaft through said resilient member.

2. A guide drum assembly as claimed in claim 1 which further comprises a restricting member for restricting a displacement of said rotor in a radial direction of said rotary shaft, said resilient member absorbing vibrations of said rotor in a circumferential direction.

3. A guide drum assembly as claimed in claim 1 in which said stationary drum has a center hole through which said rotary shaft penetrates.

4. A guide drum assembly as claimed in claim 1 which further comprises means for generating a signal for controlling a rotational phase of said motor, said means being mounted on said rotor.

5. A guide drum assembly as claimed in claim 1 which further comprises means for generating a signal for controlling a rotation frequency of said motor, said means being mounted on said rotor.

6. A guide drum assembly as claimed in claim 1 which further comprises a rotor holder coupled to said resilient member and coupled rigidly to said rotary shaft.

7. A guide drum assembly as claimed in claim 6 which further comprises means for generating a signal for controllable a rotational phase of said motor, said means being mounted on said rotor holder.

8. A guide drum assembly as claimed in claim 6 which further comprises means for generating a signal for controlling a rotation frequency of said motor, said means being mounted on said rotor holder.

9. A guide drum assembly as claimed in claim 6 which further comprises a restricting member for restricting a displacement of said rotor in a radial direction of said rotary shaft, said resilient member absorbing vibrations of said rotor in a circumferential direction.

10. A guide drum assembly as claimed in claim 9 which further comprises a bearing provided between an outer peripheral surface of said rotary shaft and said restricting member.

11. A guide drum assembly as claimed in claim 1 in which said resilient member is made of rubber.

12. A guide drum assembly as claimed in claim 1 which further comprises a member which is rigidly fixed to said rotary shaft and a screw mounted on the member, said member having a hole which is filled with said resilient member, said rotor being flexibly coupled to said member through said resilient member by said screw which penetrates through said resilient member.

* * * * *